United States Patent [19]
Ito et al.

[11] Patent Number: 5,124,802
[45] Date of Patent: Jun. 23, 1992

[54] ELECTROSTATIC LASAR PRINTER WITH A SHORT SIDE LENGTH OF A MODULATION AREA FORMED BY PULSE WIDTH MODULATION SET RELATIVE TO A DETECTED TONER PARTICLE SIZE

[75] Inventors: Michio Ito, Tokyo; Masaharu Ohkubo, Yokohama; Masaki Ojima, Yokohama; Hiromichi Yamada, Yokohama; Hiroshi Sasame, Yokohama; Kaoru Seto, Yokohama; Atsushi Kashihara, Tokyo; Takashi Kawana, Yokohama; Hiroshi Mano; Tetsuo Saito, both of Tokyo; Atsushi Shoji, Yokohama, all of Japan

[73] Assignee: Canon Kabushiki Kaisha, Tokyo, Japan

[21] Appl. No.: 588,327

[22] Filed: Sep. 26, 1990

[30] Foreign Application Priority Data

Sep. 26, 1989 [JP] Japan .................................. 1-248069
Nov. 22, 1989 [JP] Japan .................................. 1-301965

[51] Int. Cl.$^5$ ........................ H04N 1/29; H04N 1/036
[52] U.S. Cl. ................................... 358/298; 358/300; 358/457; 346/160

[58] Field of Search .......................... 346/153.1, 160; 358/298, 300, 457, 459, 468; 118/653; 430/111

[56] References Cited

U.S. PATENT DOCUMENTS

| | | | |
|---|---|---|---|
| 4,826,747 | 5/1989 | Chiba et al. | 346/160 |
| 4,864,419 | 9/1989 | Saito et al. | 358/300 |
| 4,866,533 | 9/1989 | Nagashima | 358/298 |
| 4,914,459 | 4/1990 | Mama et al. | 346/160 |
| 5,003,917 | 4/1991 | Toyoshi | 118/653 |

Primary Examiner—Benjamin R. Fuller
Assistant Examiner—Scott A. Rogers
Attorney, Agent, or Firm—Fitzpatrick, Cella, Harper & Scinto

[57] ABSTRACT

An image forming apparatus includes an area modulation means for forming a halftone image signal by area modulation according to input image data, and a recording unit for performing recording using a particle-type recording material according to the halftone image signal, wherein the length of a short side of a minimum modulation area of the area modulation means formed by the recording unit is set to 0.7–4 times an average particle size of the particle-type recording material.

20 Claims, 22 Drawing Sheets

FIG. 1

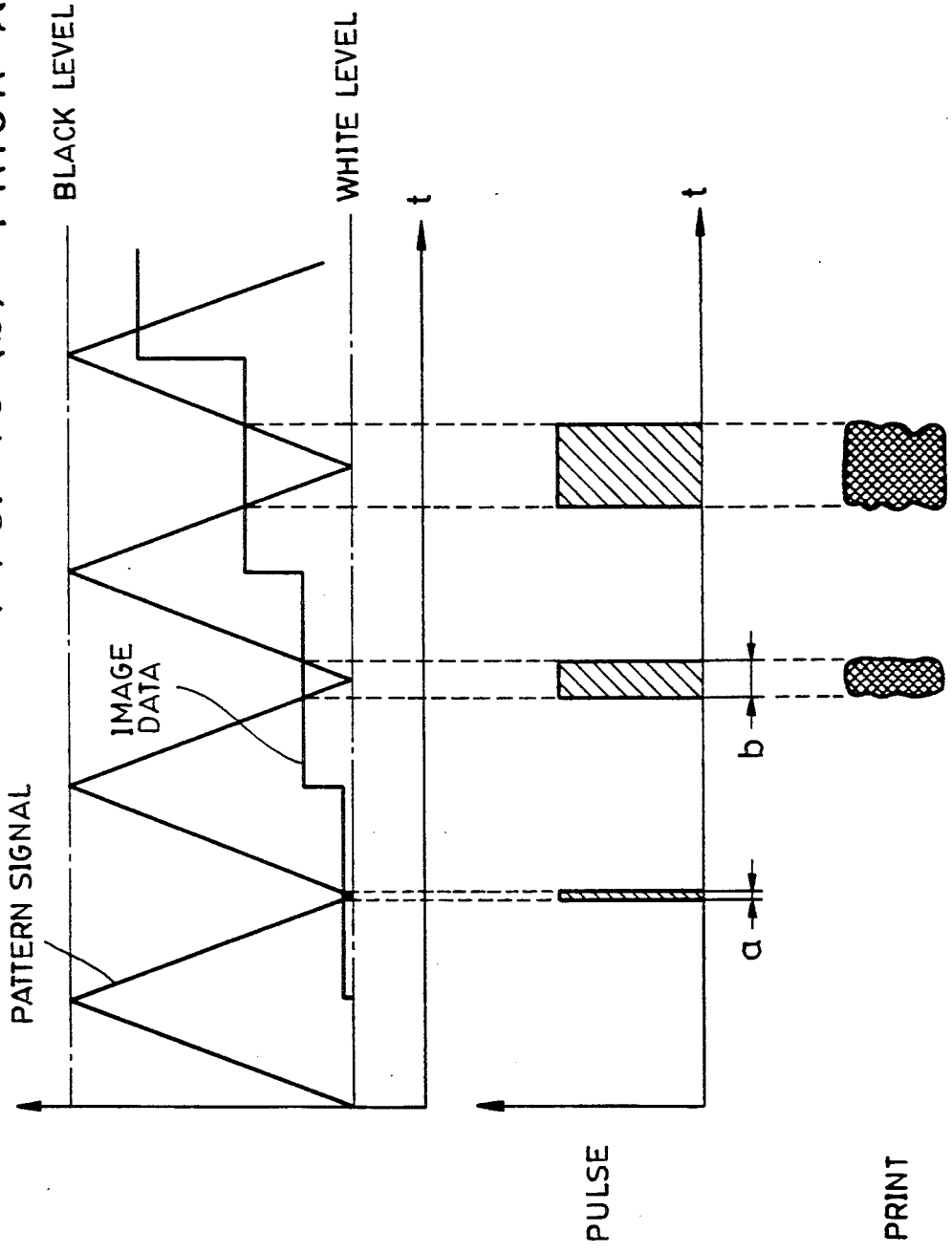

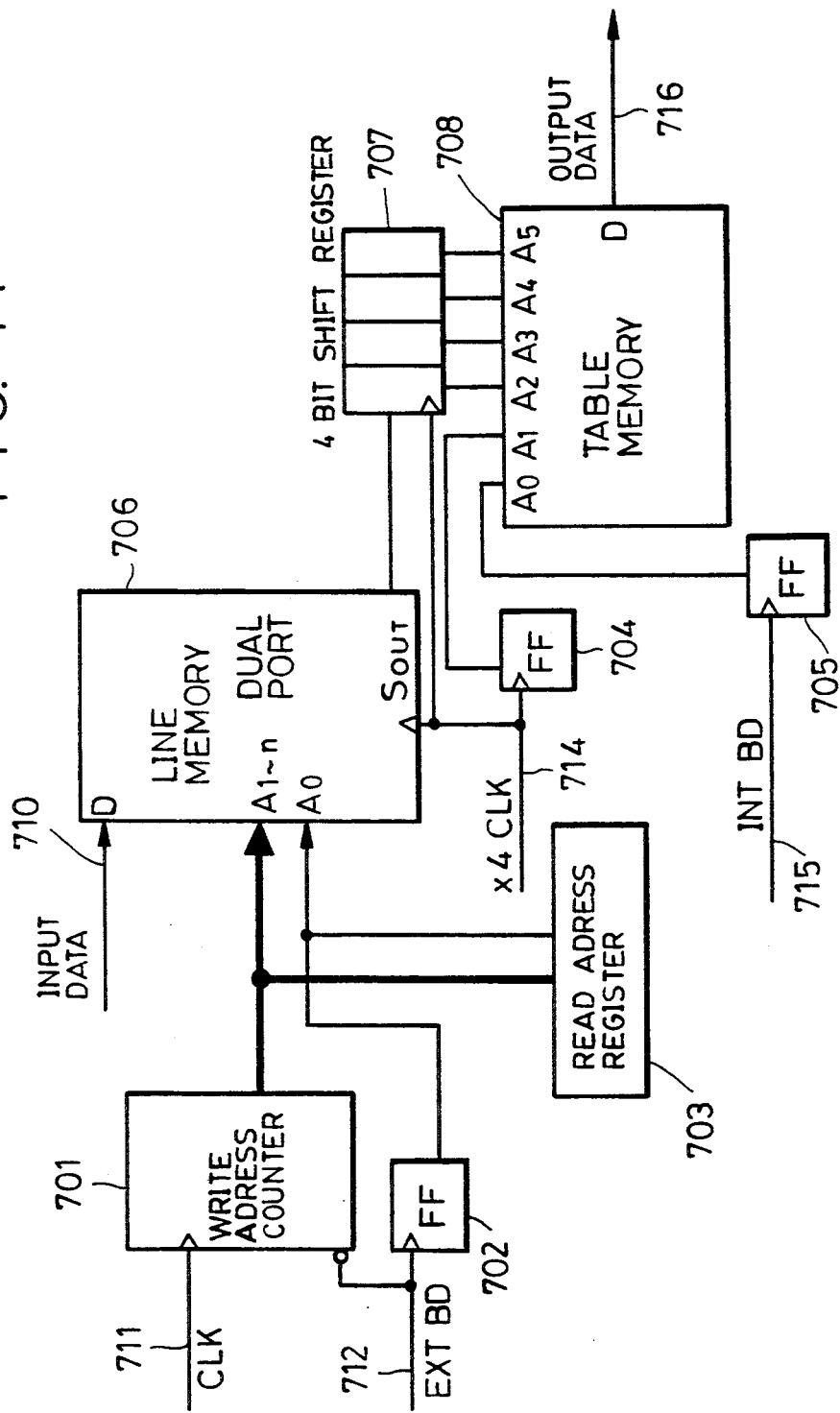

TABLE 1

| i−1, j | i−1, j+1 | i, j | i, j−1 | $L_{ij}$ |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 1 |
| 0 | 1 | 0 | 0 | 0 |
| 0 | 1 | 0 | 1 | 0 |
| 0 | 1 | 1 | 0 | 1 |
| 0 | 1 | 1 | 1 | 1 |
| 1 | 0 | 0 | 0 | 0 |
| 1 | 0 | 0 | 1 | 1 |
| 1 | 0 | 1 | 0 | 0 |
| 1 | 0 | 1 | 1 | 1 |
| 1 | 1 | 0 | 0 | 0 |
| 1 | 1 | 0 | 1 | 1 |
| 1 | 1 | 1 | 0 | 1 |
| 1 | 1 | 1 | 1 | 1 |

TABLE 2

| i | i | i+1 | i+1 | Rij |
|---|---|---|---|---|
| j | j+1 | j | j+1 | |
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 1 |
| 0 | 1 | 1 | 1 | 1 |
| 1 | 0 | 0 | 0 | 0 |
| 1 | 0 | 0 | 1 | 1 |
| 1 | 0 | 1 | 0 | 1 |
| 1 | 0 | 1 | 1 | 1 |
| 1 | 1 | 0 | 0 | 0 |
| 1 | 1 | 0 | 1 | 1 |
| 1 | 1 | 1 | 0 | 1 |
| 1 | 1 | 1 | 1 | 1 |

| FIG. 21A | FIG. 21B |

FIG. 23A
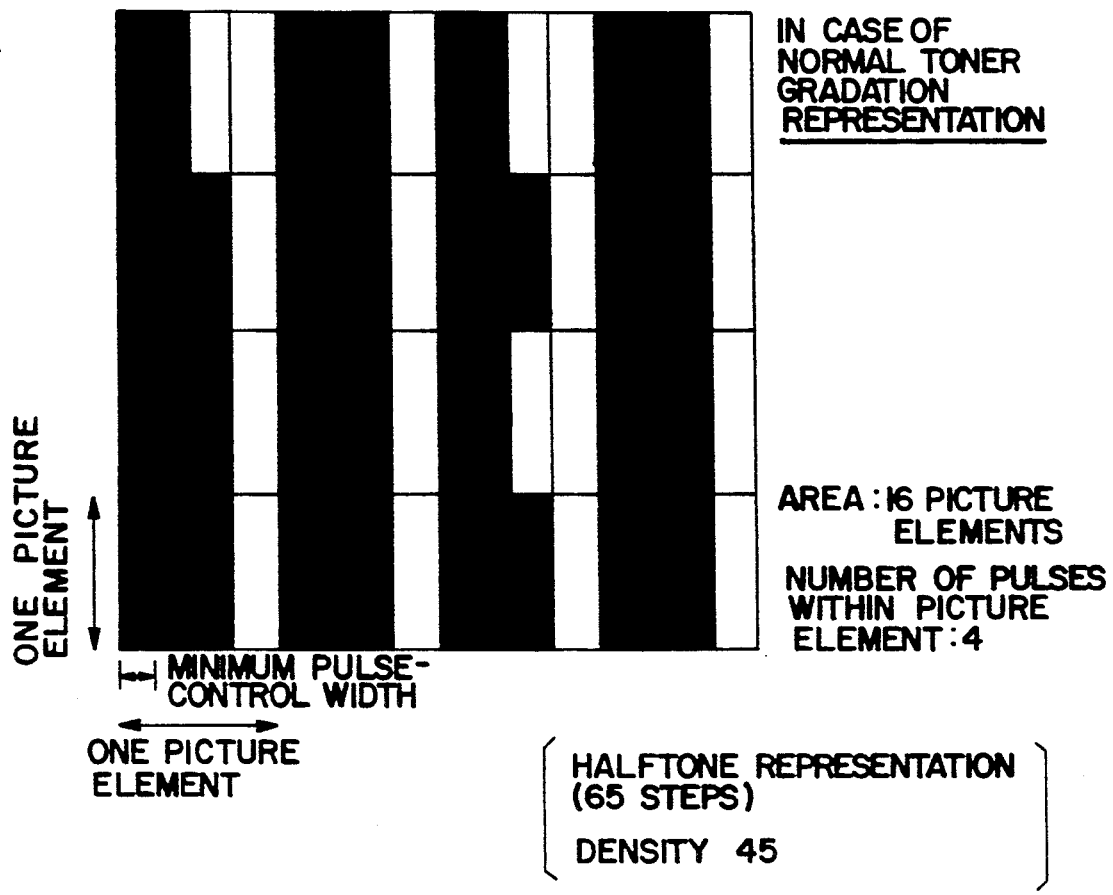
IN CASE OF NORMAL TONER GRADATION REPRESENTATION
AREA: 16 PICTURE ELEMENTS
NUMBER OF PULSES WITHIN PICTURE ELEMENT: 4
{ HALFTONE REPRESENTATION (65 STEPS)
DENSITY 45 }
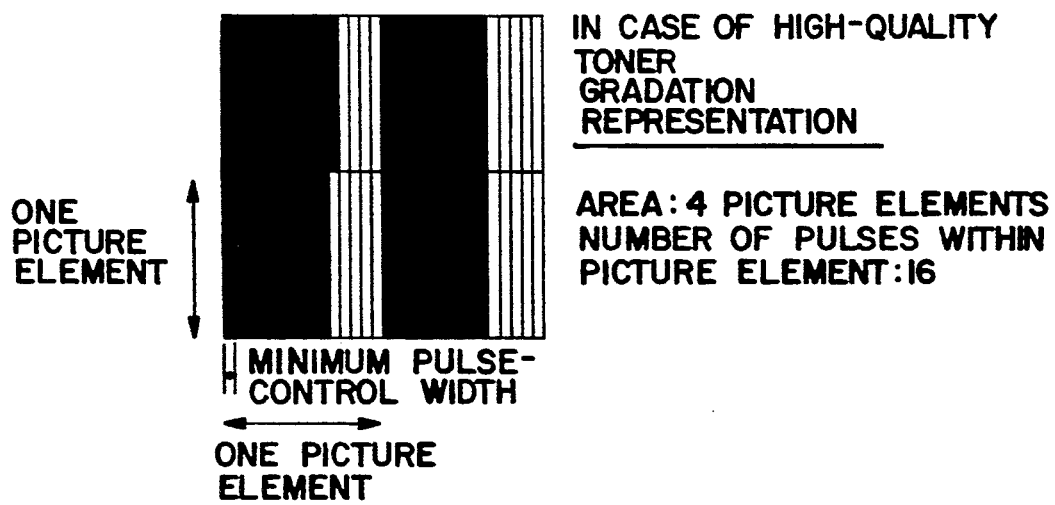
IN CASE OF HIGH-QUALITY TONER GRADATION REPRESENTATION
AREA: 4 PICTURE ELEMENTS
NUMBER OF PULSES WITHIN PICTURE ELEMENT: 16
FIG. 23B

GRADATION REPRESENTATION BY A PLURALITY OF PICTURE ELEMENTS
PWM
FIG.24A
DENSITY 0
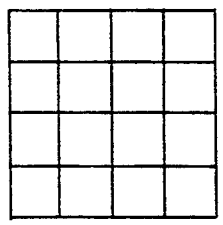
DENSITY 0
FIG.24B
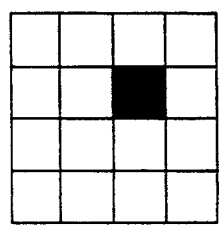
1
ONE PICTURE ELEMENT
1
ONE PICTURE ELEMENT
FIG.24C
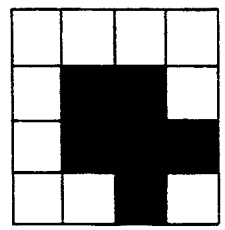
6
6
FIG.24D
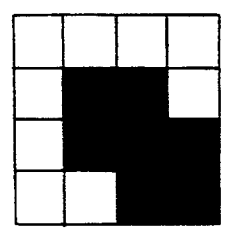
7
7
FIG.24E
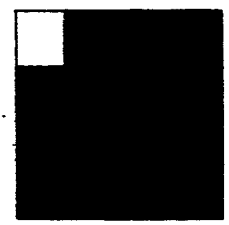
15
15
FIG.24F
16
16

ELECTROSTATIC LASAR PRINTER WITH A SHORT SIDE LENGTH OF A MODULATION AREA FORMED BY PULSE WIDTH MODULATION SET RELATIVE TO A DETECTED TONER PARTICLE SIZE

BACKGROUND OF THE INVENTION

1. Field of the Invention

This invention relates to an image forming apparatus which is able to record high quality images including halftone images, based on image data such as that input from a host computer, an image reader, a controller, a communication line etc.

2. Description of the Related Art

Recently, printing apparatuses using an electrophotographic method, such as laser printers and the like, have widely been used as computer output apparatuses. Such printing apparatuses have advantages of high picture quality, low noise and the like, and have rapidly spread particularly in the field of desk-top publishing from the viewpoint of high picture quality.

Demand for high picture quality in halftone-image outputs as well as in line-image outputs of such printers has been more and more increasing.

A dither method is widely used when a halftone image is output. In the dither method, each density in a halftone image is represented by a dither matrix of predetermined size. Therefore, the dither method has the problem that if the dither matrix is made large, resolution is decreased while density gradation is excellent, and if the dither matrix is made small, density gradation in decreased while resolution is increased.

As a method for solving the problem, there is a pulse-width modulation method which has recently been practiced in laser printers. According to this method, since many gradation steps can be obtained with a small area, resolution and gradation can be compatible. Circuitry shown in FIG. 9 is a schematic block diagram of a pulse-width modulation method. As shown in FIG. 9, the circuitry includes a pattern signal generation circuit 301, a D/A converter 302 and a comparison circuit 303. An input digital image signal converted into an analog signal by the D/A converter is compared with a pattern signal, and printing is performed when the image signal is larger than the pattern signal, as shown for example in FIG. 10(a).

In the above-described pulse-width modulation method, however, when low-density image data are input, the pulse width becomes very narrow, and the output signal cannot be sufficiently developed. As a result, an image is obtained in which highlight portions become too white.

Referring, for example, to FIG. 10(b), a phenomenon occurs in which printing is performed with a pulse width "b", while printing is not performed with a pulse width "a".

In the above-described printing apparatuses, a print image is constituted by a plurality of picture elements (pixels). The current density of picture elements is 240 dpi (dots per inch)–400 dpi, and the size of one picture element is about 60–100 μm. These values very nearly correspond to the resolution (about 80 μm) of a human being having normal visual acuity when viewing an object 30 cm away. Thus, the individual picture elements can be recognized when a curve or an oblique line is represented by a printing apparatus having aa picture-element density of about 300 dpi. Accordingly, demand for printing having higher resolution has increased. Furthermore, demand for halftone representation has also increased.

For such demands for high-resolution printing and halftone printing, the diameter of toner particles currently used is about 10 μm. If it is assumed that toner particles are homogeneous and uniformly cover picture elements, a little more than sixty toner particles adhere for a picture element of 300 dpi. For a picture element of 600 dpi, only a little more than ten toner particles adhere. Actually, toner particles adhere in multiple layers, and so the actual amount of toner particles that adhere is larger than the above-described figures. However, when printing is performed for smaller picture elements having a density of 600 dpi or more, variations in the amount of particles that adhere become a problem, and causes, for example, inconsistent image density. Thus, even though the density is increased, picture quality is not improved. Halftone representation is determined by the amount of toner particles that adhere to a unit area. The size of one picture element when printing at 600 dpi is about 40×40 μm, and so the number of adherable toner particles is about a little more than ten. Hence, it is impossible to provide an image having a large gradation range.

In order to solve the above-described problems, toner having a particle size of about 4–7 μm has been developed. The average size of the fine-particle toner is about ½ that of conventional toner, and hence ¼ in area and ⅛ in volume. By using the fine-particle toner in 600-dpi printing, the same quality image can be obtained as when normal toner of about 10 μm is used in 300-dpi printing. However, toner for high definition is higher in cost than conventional toner.

Accordingly, it has become necessary to properly use in a printing apparatus various toners having different particle sizes in accordance with cost. A conventional printing apparatus, however, did not have a method for discriminating toners having different particle sizes. Hence, it was necessary for an operator to set up the use of proper toner.

In the prior art, switching of the processing system in a printer is determined only between a host computer and the printer, and the kind of toner actually used cannot be directly known. Hence, the prior art has the following disadvantages:

(1) When a command for high-density printing is transmitted from the host computer to the printer while low-quality toner is used, printing is performed without changing the toner, and hence a blurred image is obtained.

(2) When a processing system which does not coincide with the kind of toner is assigned from the host computer, it is impossible to notify the computer of the fact. Hence, wasteful data transfer is performed which is thrown away after being transmitted.

SUMMARY OF THE INVENTION

It is an object of the present invention to provide an image forming apparatus capable of recording a high-quality image in which the above-described disadvantages have been solved.

It is another object of the present invention to provide an image forming apparatus capable of obtaining a high-picture-quality halftone image that preserves gradation even in highlight portions.

It is still another object of the present invention to provide an apparatus capable of forming an optimum image conforming to the size of particles by changing an image processing mode for recording in accordance with the size of image forming particles, such as toner particles or the like.

These and other objects are accomplished, according to one aspect of the present invention, by an image forming apparatus comprising area modulation means for forming a halftone image according to multivalue image data, and recording means for recording an image in accordance with an output from the area modulation means, wherein the length of a short side of a minimum modulation area when forming the halftone image is set to 0.7–4 times an average particle It is preferred that the area modulation means performs modulation by pulse-width modulation.

According to another aspect, the present invention relates to an image forming apparatus comprising detection means for detecting a particle size of a particle-type recording material, and changing means for changing a quality of a recording image on a recording medium according to a result of detection by the detection means.

According to the above-described configuration, it is possible to determine the size of particles within a toner cartridge and to obtain an image having an optimum quality corresponding to the capability of the particle size to represent an image.

The foregoing and other objects of the present invention will become more apparent from the following detailed description taken in connection with the accompanying drawings.

BRIEF DESCRIPTION OF THE DRAWINGS

FIG. 14 is a block diagram of a line-memory configuration system;

FIG. 23A and 23 show diagrams for explaining comparison of areas according to a plurality of picture element/PWM ratio; and FIGS. 24A–F show diagrams for explaining halftone representation by a plurality of picture elements and PWM.

DETAILED DESCRIPTION OF THE PREFERRED EMBODIMENTS

First Embodiment

Figure 1:
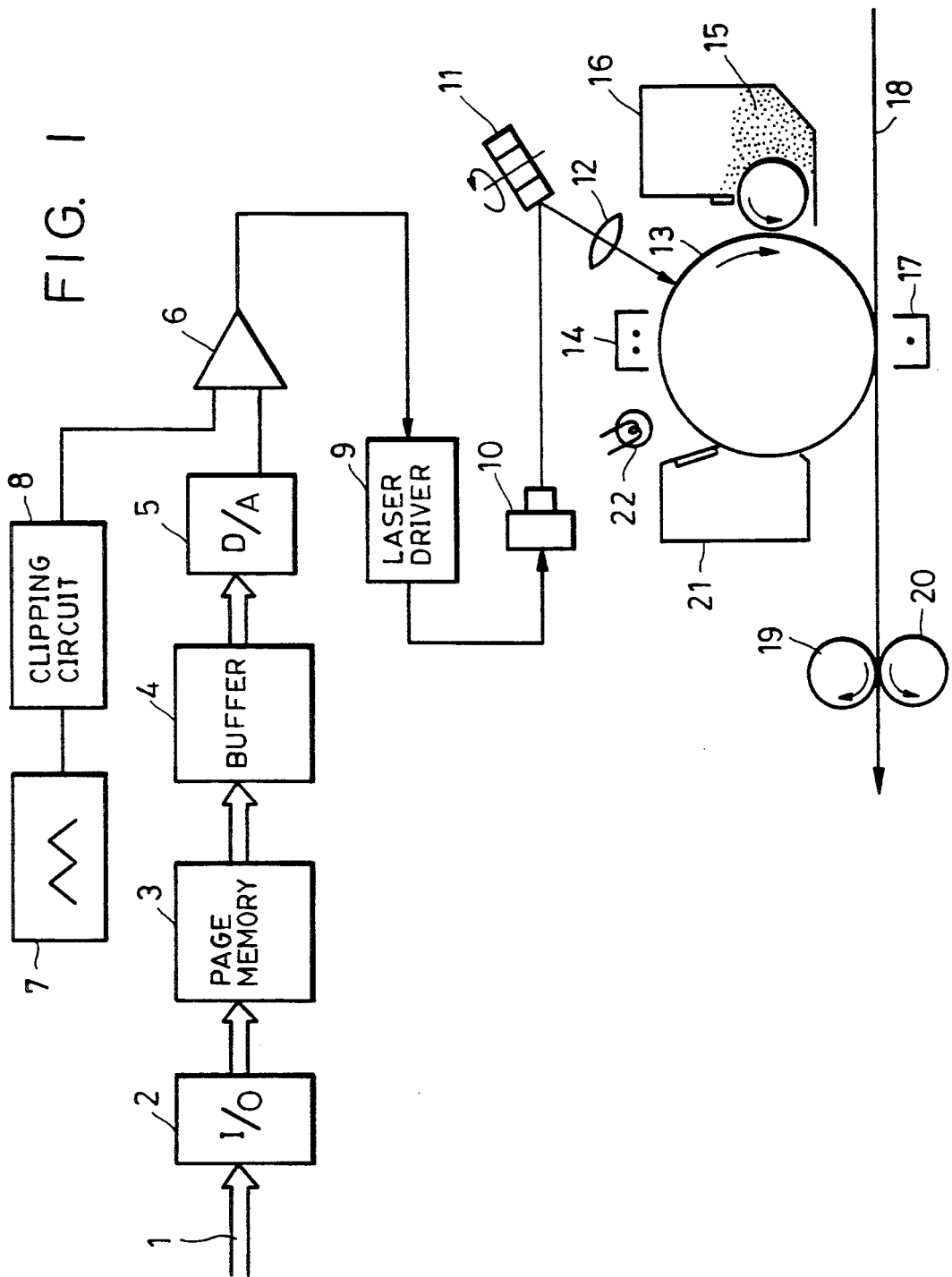
FIG. 1 is a block diagram showing the configuration of a printing apparatus according to a first embodiment of the present invention.

FIG. 1 is a diagram showing the configuration of a printing apparatus according to a first embodiment.

In FIG. 1, multivalue digital image data 1 transmitted from a host computer or the like (not shown) are input within a printer through an I/O port 2, and are successively stored in a page memory 3. The data arranged as an 8-bit multivalue video signal within the page memory 3 are successively read by a line buffer 4 when printing has started. The signal is synchronized with a beam detection (BD) signal, serving as a horizontal synchronizing signal of the printer, and is then converted into an analog signal having "256" levels by a D/A converter 5. The analog signal is compared with a semi-triangular wave obtained by clipping the lower side of a triangular wave having a predetermined period output from a signal generator 7 with a clipping circuit 8, and is converted from a signal in the direction of depth into a signal in the direction of time length, that is, subjected to pulse-width modulation. This operation will now be explained by reference to FIG. 2.

Figure 2:
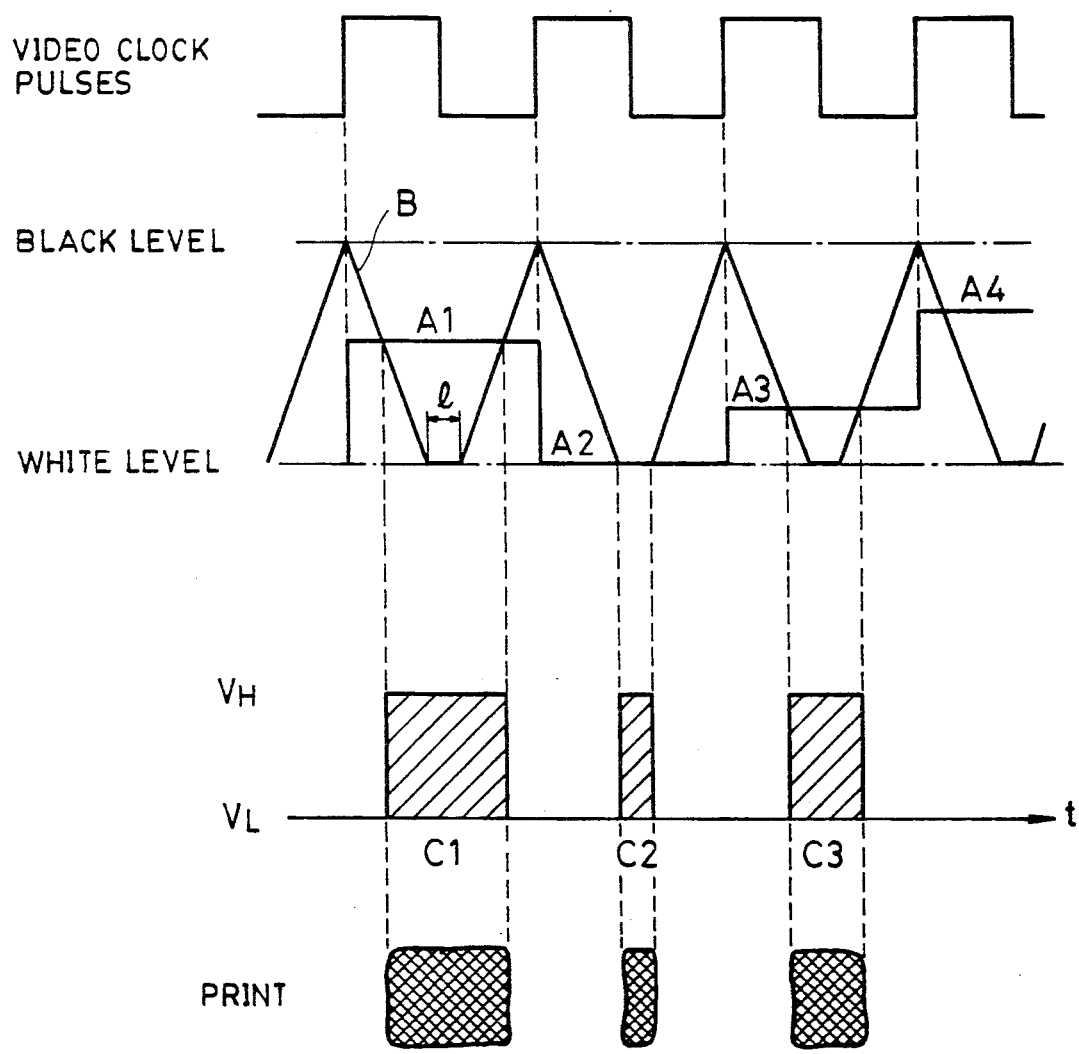
FIG. 2 is a diagram for explaining an example of pulse-width modulation signal outputs in the first embodiment.

Signal A ($A_1$, $A_2$, —) shown in FIG. 2 is an image signal output from the D/A converter 5, and signal B is a semi-triangular wave from the clipping circuit 8.

The signals A and B are synchronized with each other by a video clock signal, as shown in FIG. 2. Signal C ($C_1$, $C_2$, —) is a signal obtained by synthesizing the signals A and B after comparing them by the comparator 6, that is, a pulse-width modulated signal. When A>B, the output from the comparator 6 is turned on, and when A<B, the output is turned off.

The output signal from the comparator 6 is input to a laser driver 9, which drives a laser diode 10. Laser light from the laser diode 10 is reflected by a rotating polygon mirror 11, and is converted into scanning light, which is focused onto a photosensitive member 13 by a lens 12 having an f-0 characteristic to become constant-speed scanning light having a spot size of about 100 $\mu$m. A part of the scanning light is received by a beam detecting device (not shown) to be used as the BD signal, serving as a horizontal synchronizing signal for the printer or a synchronizing signal for the signal generator 7.

After having been uniformly charged by a charger 14, the photosensitive member 13 receives the above-described laser scanning light to form an electrostatic latent image on its surface. The developing unit 16 containing toner 15 then develops the electrostatic latent image. The developed pattern is transferred onto a transfer material 18 by a transfer charger 17, and the transferred pattern is fixed by thermal fixing rollers 19 and 20. Tone remaining on the surface of the photosensitive member 13 without being transferred is collected by a cleaner 21. Electric charges on the photosensitive member 13 are removed by pre-exposure 22, and the same image forming processes are repeated again.

In the present printing apparatus, single-component magnetic toner having a particle size of about 12 μm is used as the toner 15, and jumping development is performed. The period of the semi-triangular wave B shown in FIG. 2 is set to 169 μm on the surface of the photosensitive member 13 so that an output halftone image has a resolution of 150 lines/inch. At this time, a halftone image having the finest highlight portions could be obtained when length 1 (in FIG. 2) of the base portion of the semi-triangular wave B was set to 30 μm, which is about 2.5 times the particle size of the toner, on the surface of the photosensitive member 13.

According to studies by the inventors, in a laser printer apparatus using an electrophotographic method, the minimum printable pulse width exists in accordance with toner particle size, laser characteristics, charging characteristics, development characteristics and the like. Among these factors, toner particle size has the greatest influence.

Figure 3:
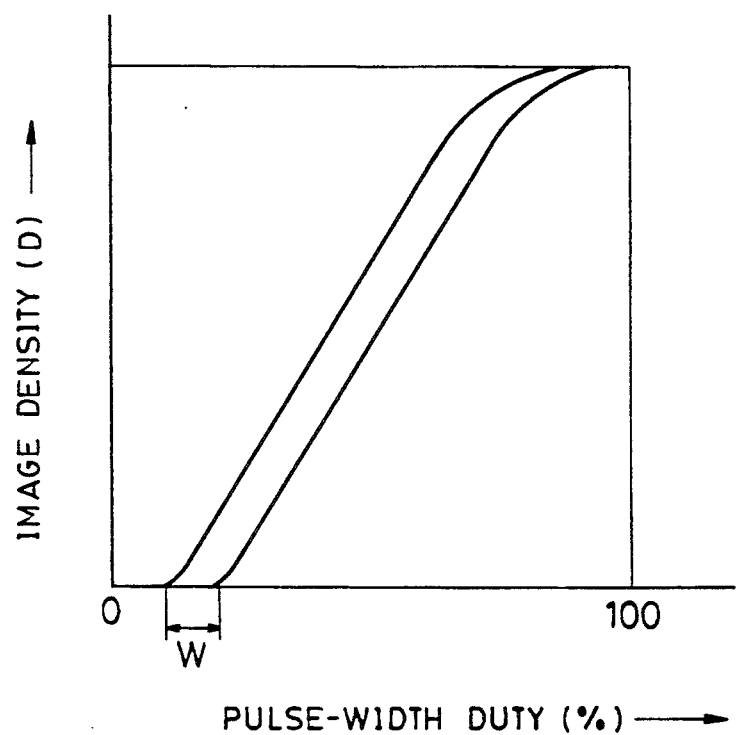
FIG. 3 is a diagram for explaining a relationship between pulse-width duty cycle and output image density in a laser printer apparatus.

FIG. 3 shows a relationship between pulse-width duty and image density obtained using the above-described printer. The abscissa represents pulse-width duty, and the ordinate represents image density. The minimum developable pulse width, which more or less changes in accordance with laser characteristics, development characteristics and the like, had values corresponding to 0.7–4 times (portion W in FIG. 3) the average particle size of the toner. The result obtained when the average particle size of the toner was changed to about 12 μm, about 10 μm, about 8 μm and about 6 μm was 0.7–4 times, and more preferably 2–3 times the average particle size of the toner.

It can be considered that this indicates that development can first start faintly when an electrostatic latent image forms having a width within which 1–4 toner particles, and more preferably, 2–3 particles, can adhere.

As explained above, the first embodiment has the effects that, by setting the minimum modulation area to 0.7–4 times toner's average particle size when a halftone image is formed by an area modulation means, such as pulse-width modulation method or the like, it is possible to complement incompletely-developed areas in an image recording apparatus and to obtain an excellent halftone image having gradation even in highlight portions.

Second Embodiment

A second embodiment will now be explained which performs the above-described pulse-width modulation by a dither method.

Figure 4:
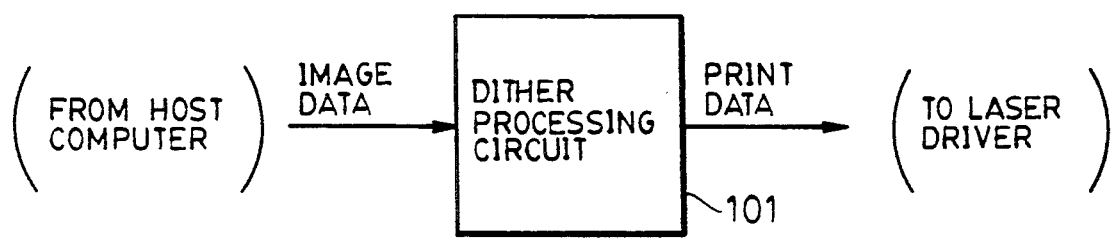
FIG. 4 is a block diagram for explaining a second embodiment.

As a printing apparatus, a 400-dpi laser printer is used. The printer has, however, an image clock signal corresponding to 10 times 400 dpi, and its resolution corresponds to 4000 dpi only in the main scanning direction. FIG. 4 is a block diagram of a data processing circuit according to the second embodiment. Image data having multivalue bits (5 bits in the FIG. 4 example) are input to a dither processing circuit 101, where each picture element in the data is compared with a predetermined threshold value, and print data are output.

Figure 5:
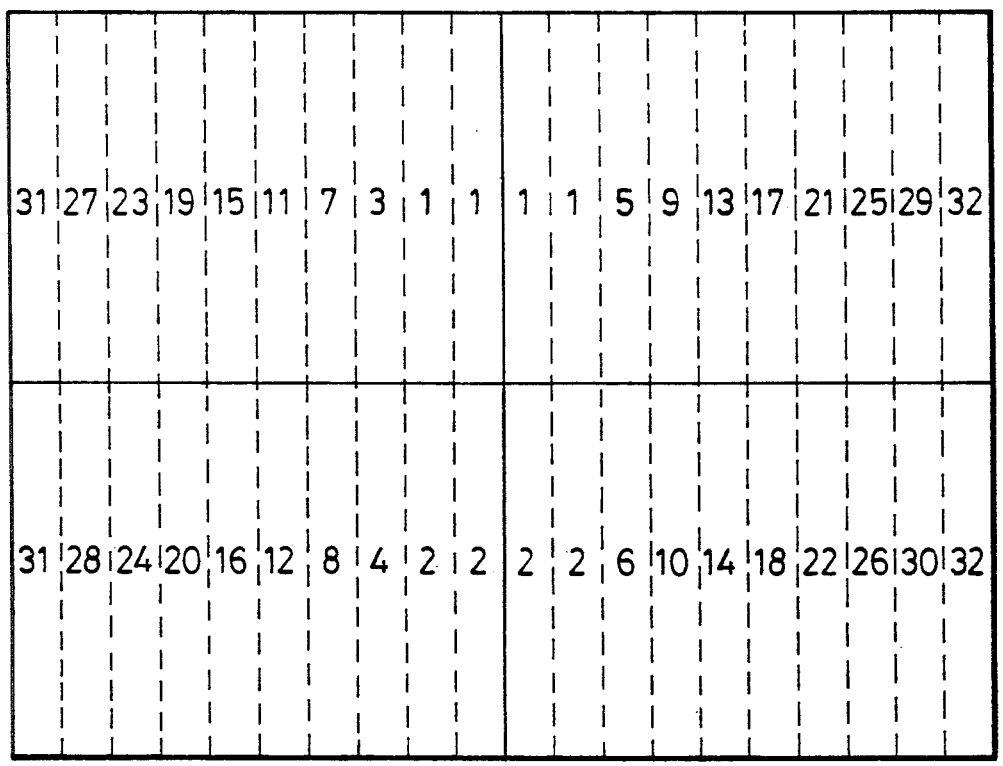
FIG. 5 is a diagram showing an example of a dither matrix in the second embodiment.

FIG. 5 is a schematic diagram showing a dither matrix formed by the dither processing circuit 101. The size of the dither matrix corresponds to 2×2 picture elements in the 400 dpi laser printer, and a halftone image having 200 vertical and horizontal lines can be output.

Since the image clock signal in the main scanning direction is ten times the resolution, the matrix contains 2×2×10, that is, 40 picture elements.

In the present embodiment, a reversal development method is used in which the laser is turned on and areas irradiated by laser light are developed by toner when the above-described image data are equal to or more than the threshold value in the dither matrix. An image becomes white when image data are "00", and becomes black when the image data are "32".

As shown in FIG. 5, the dither matrix is formed so that a laser signal is turned on for a group of 4 picture elements for data having the smallest image density ("1" in the upper line and "2" in the lower line in FIG. 5) in each main scanning line. That is, the minimum modulation area corresponds to 4 picture elements. Since the image clock signal is set to a speed corresponding to ten times 400 dpi, 4 picture elements have the size of 25.4÷4000×4 mm, that is, 25.4 μm.

Also in the present embodiment, toner having an average particle size of about 12 μm is used, and so 4 picture elements correspond to about 2.1 times the toner's particle size.

That is, by forming such a dither matrix, it is possible to obtain a halftone image with 200 lines/inch and 32 gradation steps and having fine highlight portions.

Figure 6:
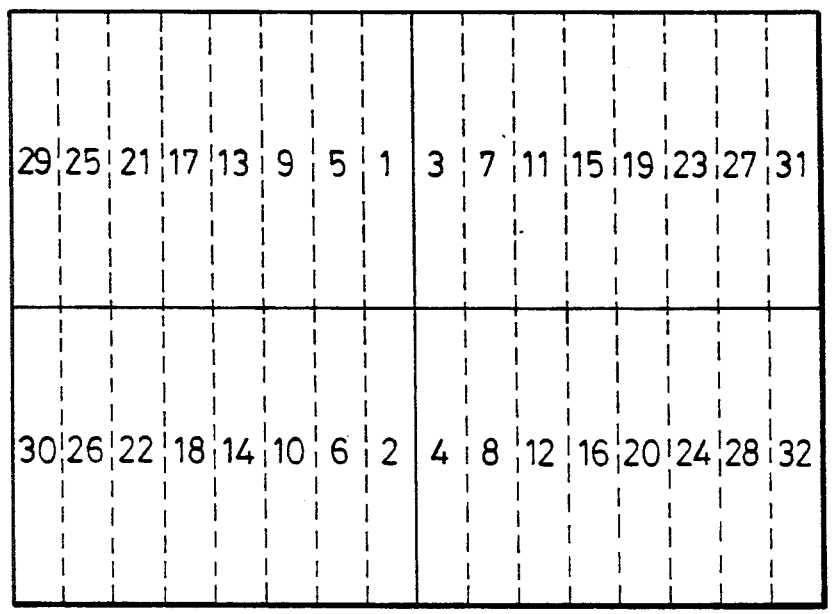
FIG. 6 is a diagram showing another example of a dither matrix.

When a dither matrix as shown in FIG. 6 was used and a halftone image with 200 lines/inch and 32 gradation steps was output with an image clock signal having a frequency corresponding to 8 times 400 psi, an image having too-white highlight portions was obtained. The minimum modulation area at this time was one picture element in the dither matrix, which is 25.4÷400÷8 mm, that is, 7.9 μm. This is 0.66 times the average particle size of the toner.

At this time, by using toner having an average particle size of about 10 μm, highlight portions could be printed with difficulty. The minimum modulation area in this case corresponds to 0.79 times the average particle size of the toner.

Third Embodiment

Figure 7:
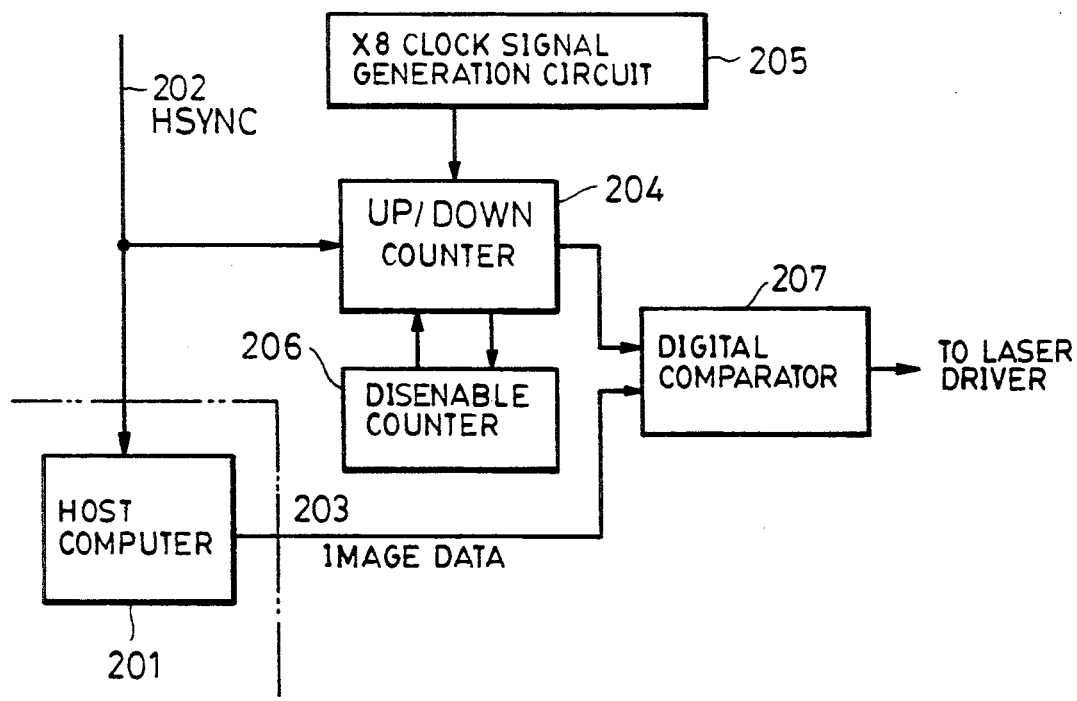
FIG. 7 is a block diagram for explaining a third embodiment.

FIG. 7 is a block diagram showing a third embodiment of the present invention, and shows a configuration when pulse-width modulation is subjected to digital processing.

When a print command for starting the printing apparatus is transmitted from a host computer 201, the printing apparatus prepares for printing, and outputs a signal to request a vertical synchronizing signal when a printing operation has been prepared. According to this signal, the host computer 201 outputs a vertical synchronizing signal. When the printing apparatus has input the vertical synchronizing signal and then sent back a horizontal synchronizing signal (HSYNC) 202, the host computer 201 outputs image data 203 with a predetermined timing in synchronization with the horizontal synchronizing signal 202. An up/down counter 204 performs counting in accordance with a clock signal from an 8-multiple clock generation circuit 205 in synchronization with the horizontal synchronizing signal 202. The up/down counter 204 disenables counting when the count value becomes "0", and returns to "enable" after counting the count number set in a disenable counter 206.

Data from the up/down counter 204 are compared with the image data 203 by a digital comparator 207. If the image data 203 are larger than the data from the up/down counter 204, the digital comparator 207 outputs a laser driving signal to a laser driver.

Figure 8:
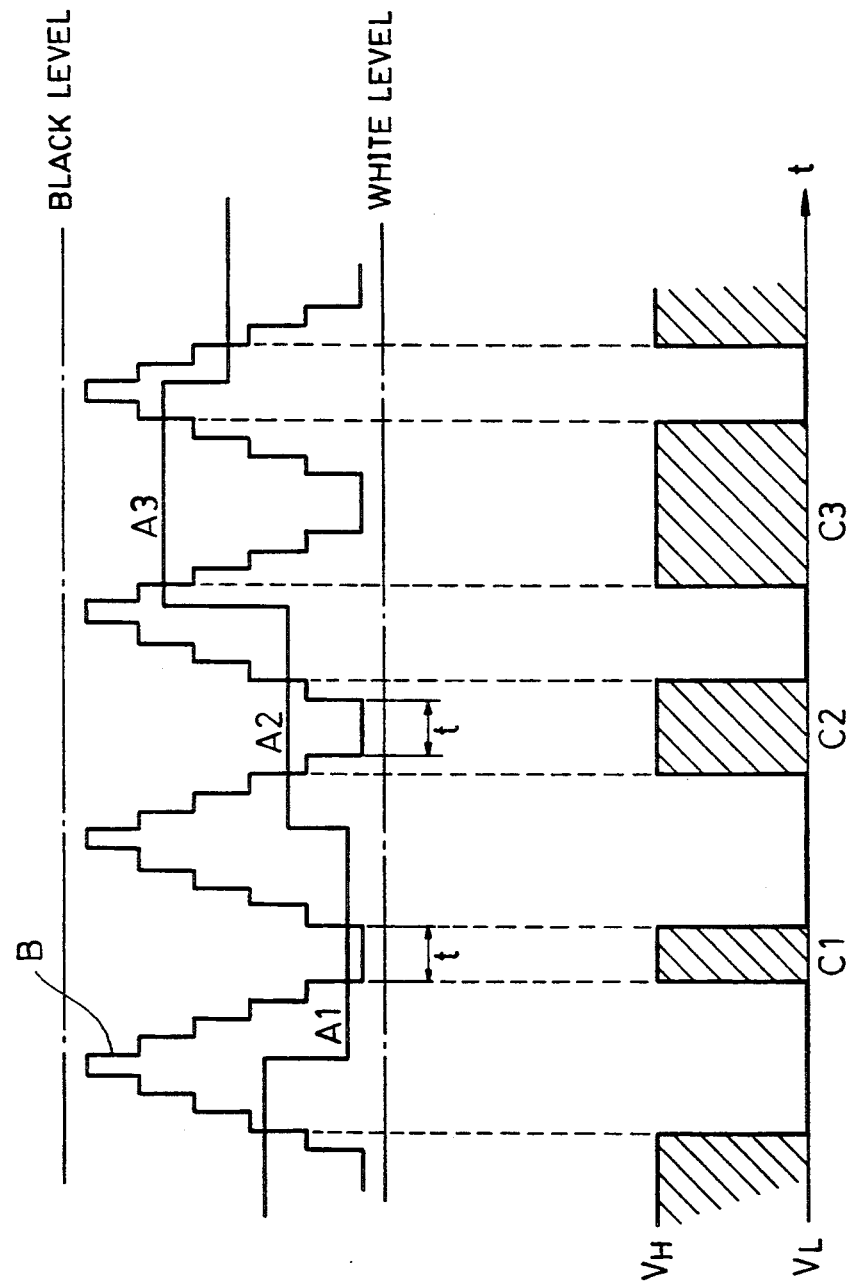
FIG. 8 is a diagram for explaining an example of pulse-width modulation signal outputs in the third embodiment.
Figure 9:
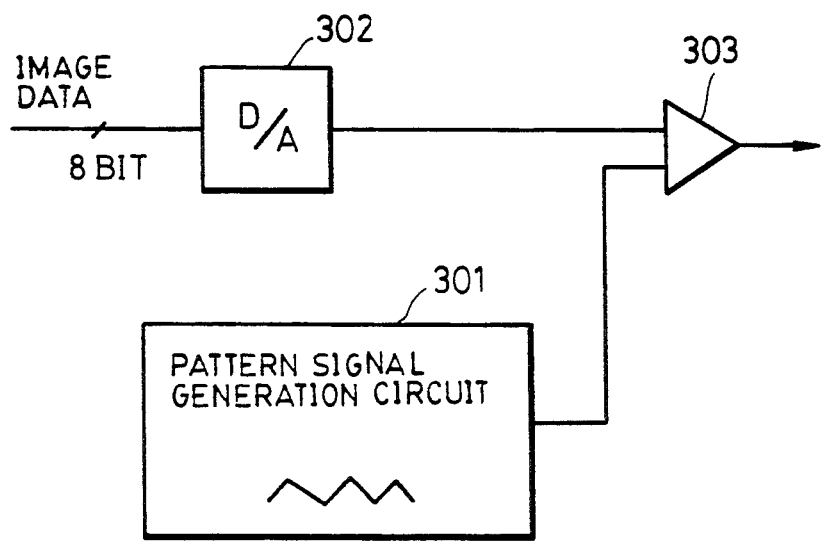
FIG. 9 is a block diagram for explaining a conventional example.
Figure 10:
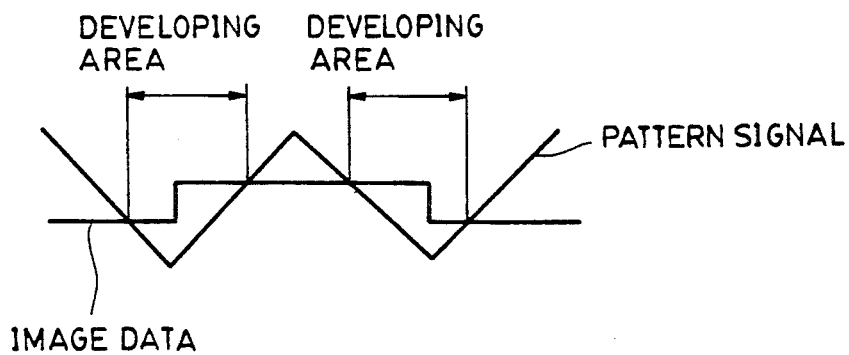
FIGS. 10(a) and 10(b) are diagrams for explaining examples of pulse-width modulation signal outputs in the conventional example.

The above-described operation is shown in FIG. 8. Signal B shown in FIG. 8 represents data from the up/down counter 204, and signal A represents the image data 203. Signal C ($C_1$, $C_2$, ---) is a signal output to the laser driver after comparing the signals A and B with each other by the digital comparator 207, that is, a pulse-width modulated signal. The signal C is output when A>B. Since the subsequent operation in the printing apparatus is the same as that in the first embodiment, an explanation thereof will be omitted.

Time t shown in FIG. 8 is a time set in the disenable counter 206, and is set to a time corresponding to 0.7-4 times, and more preferably, 2-3 times the average particle size of toner used in the present printing apparatus.

Since the pulse-width modulation in the present embodiment is performed by digital processing, it is possible to obtain a halftone image which is more stable than that in the case of pulse-width modulation by analog processing in the first embodiment.

Although, in the present embodiment, the minimum modulation area is controlled by correcting the reference waveform for comparing with image data, a method may also be used in which the minimum modulation area is controlled by performing correction (conversion) on the image data instead.

As explained above, according to the first, second and third embodiments of the present invention, a high-picture-quality halftone image having gradation can be obtained even in highlight portions.

Fourth Embodiment

FIGS. 11-21 show a fourth embodiment of the present invention. In the fourth embodiment, the particle size of toner is detected, and according to detected size information:

(1) the processing system for an image signal is switched and set to a predetermined value;

(2) various constants in the process system up to fixing the toner are set; and (3) information about the particle size of toner is transmitted to an external apparatus, such as a computer or the like, for controlling the printing apparatus.

Figure 11:
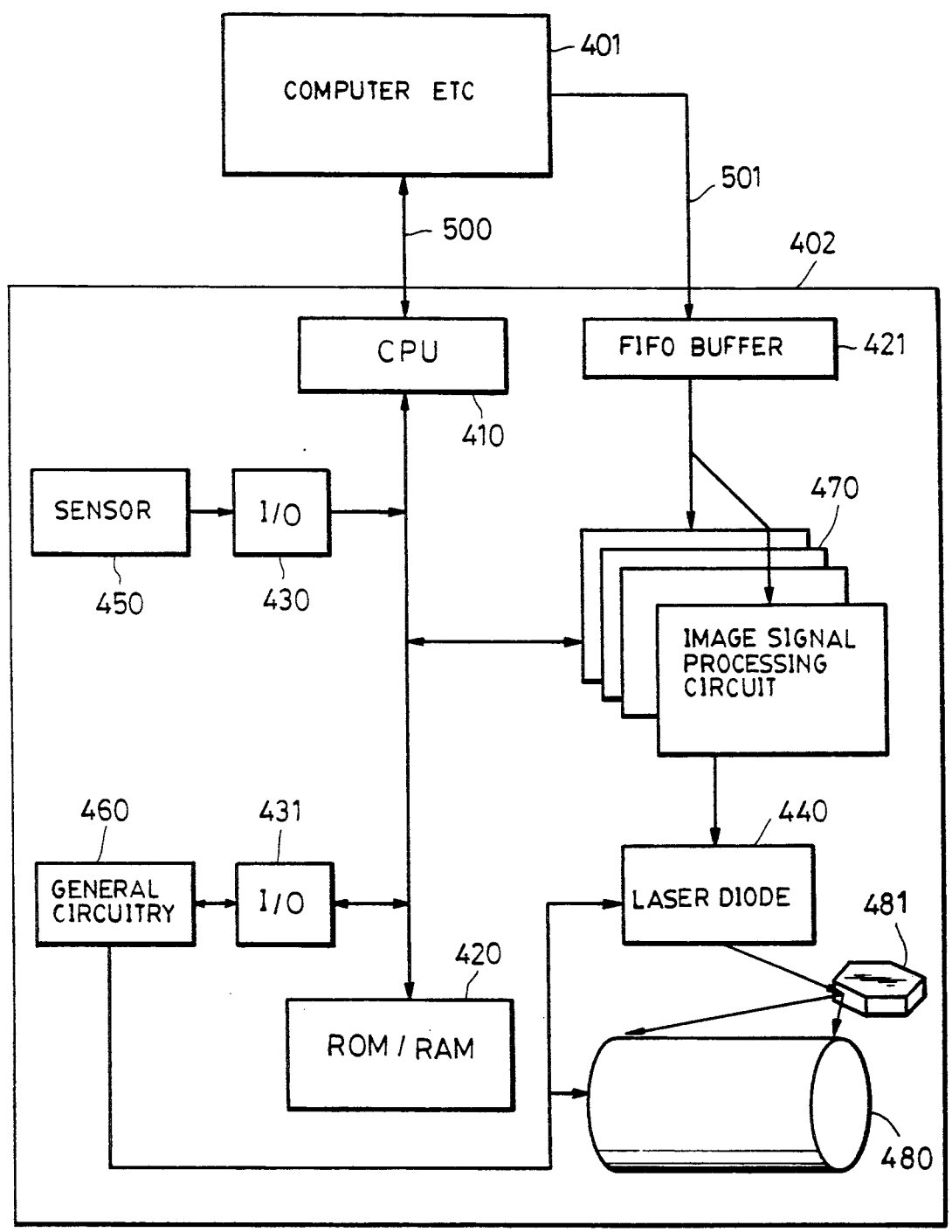
FIG. 11 is a block diagram of a system according to a fourth embodiment of the present invention.

The printing apparatus which performs the abovedescribed operations is illustrated. FIG. 11 is a block diagram of the fourth embodiment.

In FIG. 11, an external apparatus, such as a computer or the like, transmits data to the printing apparatus. The printing apparatus includes units shown within frame 402. There are shown command transmission line 500 and data transmission line 501. Normal lines are used in some cases as lines 500 and 501.

There are also shown a CPU 410, a memory 420, such as ROM/RAM or the like, I/O (input/output) ports 430 and 431, and a sensor 450 for detecting toner's particle size. A general circuitry 460 for the laser printer controls respective mechanisms shown in FIG. 12.

A buffer 421 temporarily stores data to be printed, which may not exist in some cases.

A group of processing circuits 470 is composed of a plurality of circuits for processing an image signal. One of these processing circuits is selected by the CPU 410. There are also shown a laser diode and its driving circuit 440, and a photosensitive member 480, such as a drum or the like.

Figure 18:
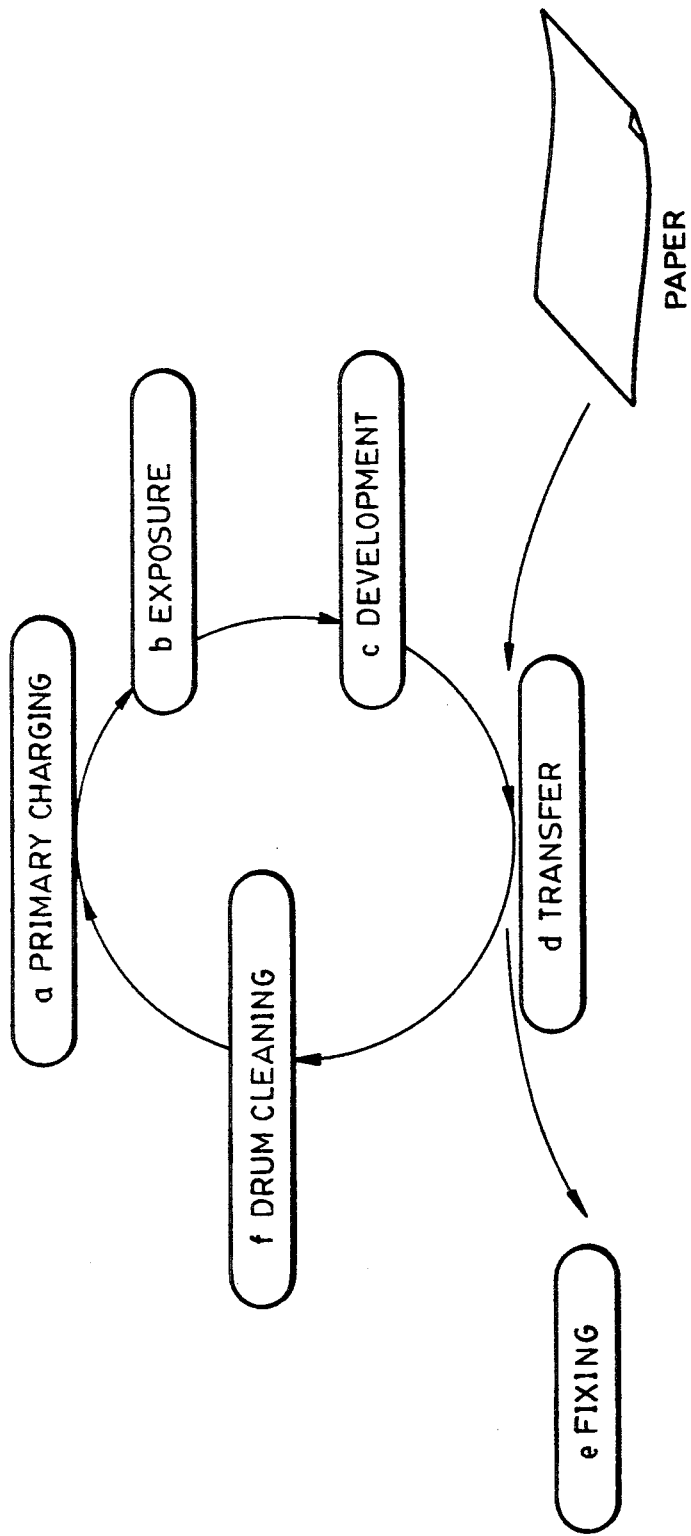
FIG. 18 shows processes in an LBP (a laser-beam printer)

As shown in the cycle depicted in FIG. 18, an electrostatic latent image is first formed by optical scanning on the photosensitive member 480, and is reduced by adherence of toner. As for the optical scanning, main scanning is performed by a polygon mirror 481 for reflecting the laser beam, and subscanning is performed by the movement of the photosensitive surface by the rotation of the drum, or the like.

When high-quality printing is performed by a laser printer or the like, it is necessary to shrink each picture element that constitutes the image. This is accomplished by performing higher frequency switching in the direction of main scanning. As for adjustment of the width of a picture element in the subscanning direction, it is necessary to change the spot size of the laser beam in addition to adjustment of the feed amount of the photosensitive surface. When the particle size of toner differs, it is also necessary to set voltage of primary charging, exposure amount and the like to different values.

Figure 12:
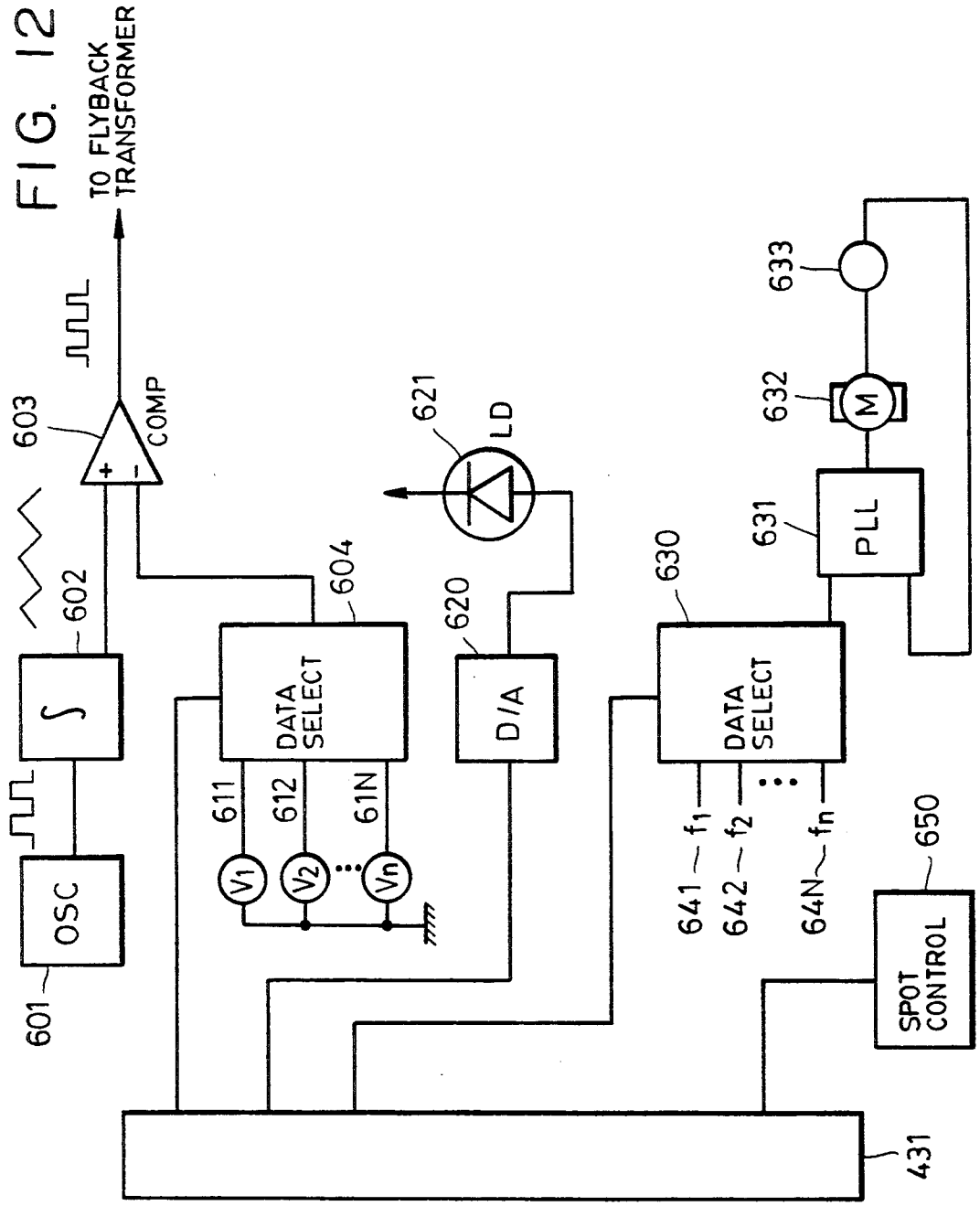
FIG. 12 is a block diagram of a printer control mechanism.

Accordingly, when high-quality printing is performed by fine-particle toner, it is necessary to adjust rotation of the mirror, rotation of the drum, the amount of the laser-beam light, spot size, voltage of primary charging and the like. The adjustment is performed via the I/O port 431 shown in FIG. 11. A part of the general circuitry 460 for performing system control other than image signal processing is shown in FIG. 12. In FIG. 12, there are shown voltage-varying units 601-604 and 611-61N for high-voltage generation circuits.

Voltage in a high-voltage generation circuit changes according to the duty ratio of pulses transmitted to a flyback transformer or the like. In the present embodiment, an output from an oscillator 601 is converted to a triangular wave by an integrating circuit 602, and is restored again into a rectangular wave by a comparator 603. The duty ratio of the rectangular wave is adjusted by selecting one of the reference voltage sources 611-61N via the I/O port 431.

A digital-to-analog (D/A) conversion circuit 620 adjusts the amount of light of a laser diode 621. A circuit block 630-633 and 641-64N changes the rate of rotation of a scanner motor 632. In order to rotate the scanner motor 632 with a constant speed, phase lock is applied by a PLL circuit 631 which inputs a value detected by a rotation detector 633 for the motor 632. The rate of rotation of the motor 632 can be selected by changing a reference frequency input to the PLL circuit 631. That is, by selecting one of the frequency sources 641-64N by a data selector 630 to change the rate of rotation, it becomes possible to change the number of scanning lines. A unit 650 changes the spot size of the laser.

Figure 13A:
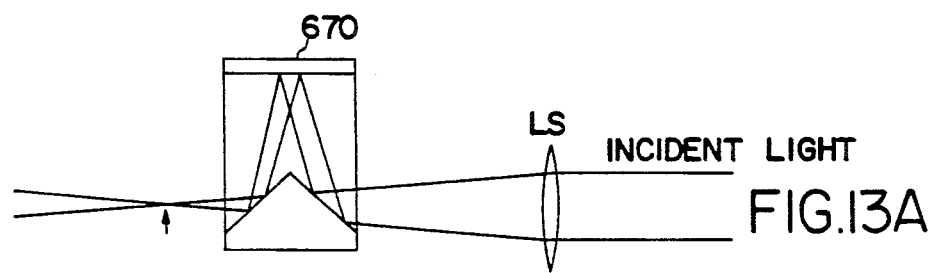
FIG. 13 A–C are diagrams for explaining a spot-size adjustment mechanism.
Figure 13B:
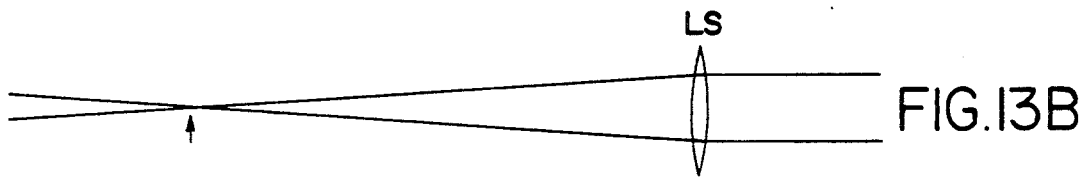
Figure 13C:
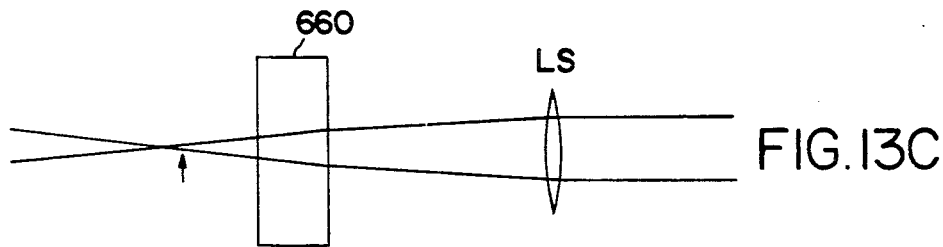

As shown in FIG. 13B, an optical path provided by condensing light by an incident-light lens LS, by FIG. 13C inserting an object 660 having high refractive index, or by FIG. 13A extending the optical path by a mirror 670, it becomes possible to change the spot size.

Figure 19:
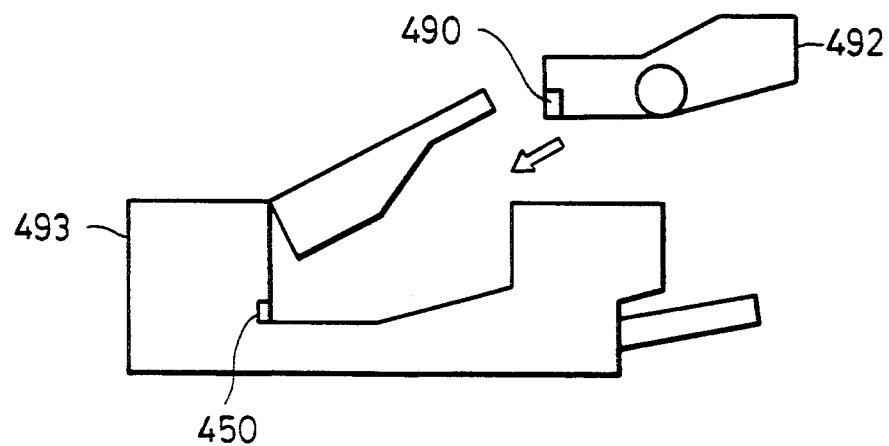
FIG. 19 is a diagram showing the configuration of an apparatus.

FIG. 19 shows the configuration of the apparatus of the present embodiment. In FIG. 19, there are shown a main body 493, a toner cartridge 492, and a cartridge discrimination means 490 provided at the toner cartridge 492. A sensor 450 provided at the main body 493 detects the discrimination means 490.

Figure 20:
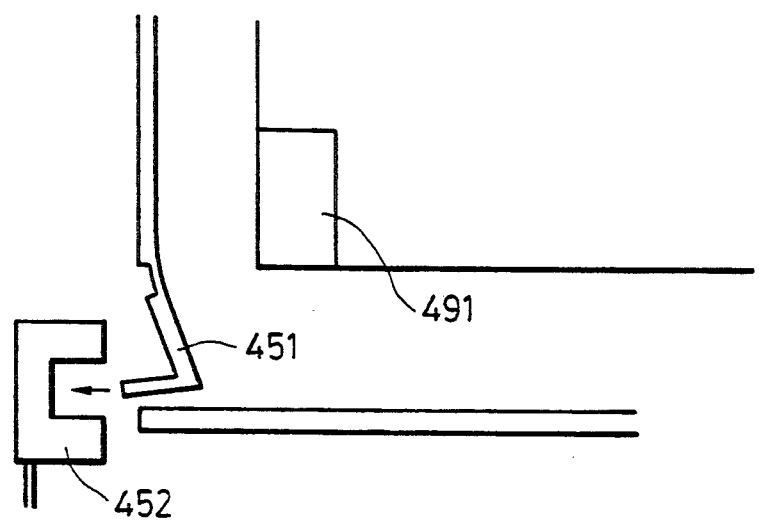
FIG. 20 is a diagram showing a detection sensor unit.

FIG. 20 illustrates the sensor and the discrimation means. A notch 491 is provided in the toner cartridge as the discrimination means. The particle size of toner is discriminated by the presence or absence of the notch 491. A pawl 451 moves according to the presence or absence of the notch 491. A light-interrupting sensor 452 detects movement of the pawl 451. In the present embodiment, the shape of the cartridge is detected by an optical means. As other means, there are methods in which a magnetic tape affixed to the cartridge is detected by a magnetic sensor, a method in which a magnetic contact is provided on the cartridge, a method in which a marker is read by a light-reflecting sensor, and the like.

Figure 21A:
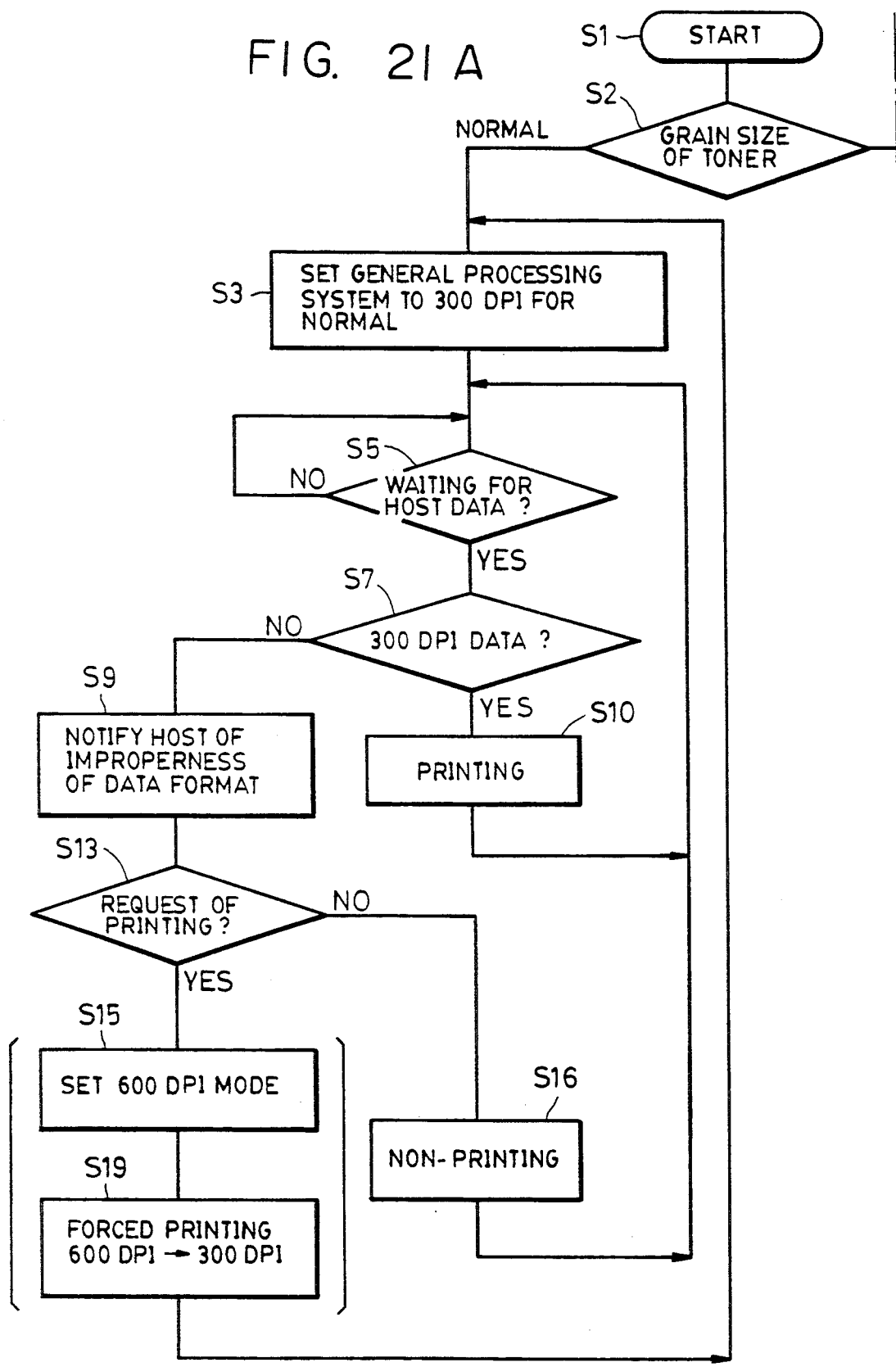
FIG. 21, composed of FIGS. 21A and 21B, is a diagram showing an algorithm for switching print density.
Figures 21, 21B:
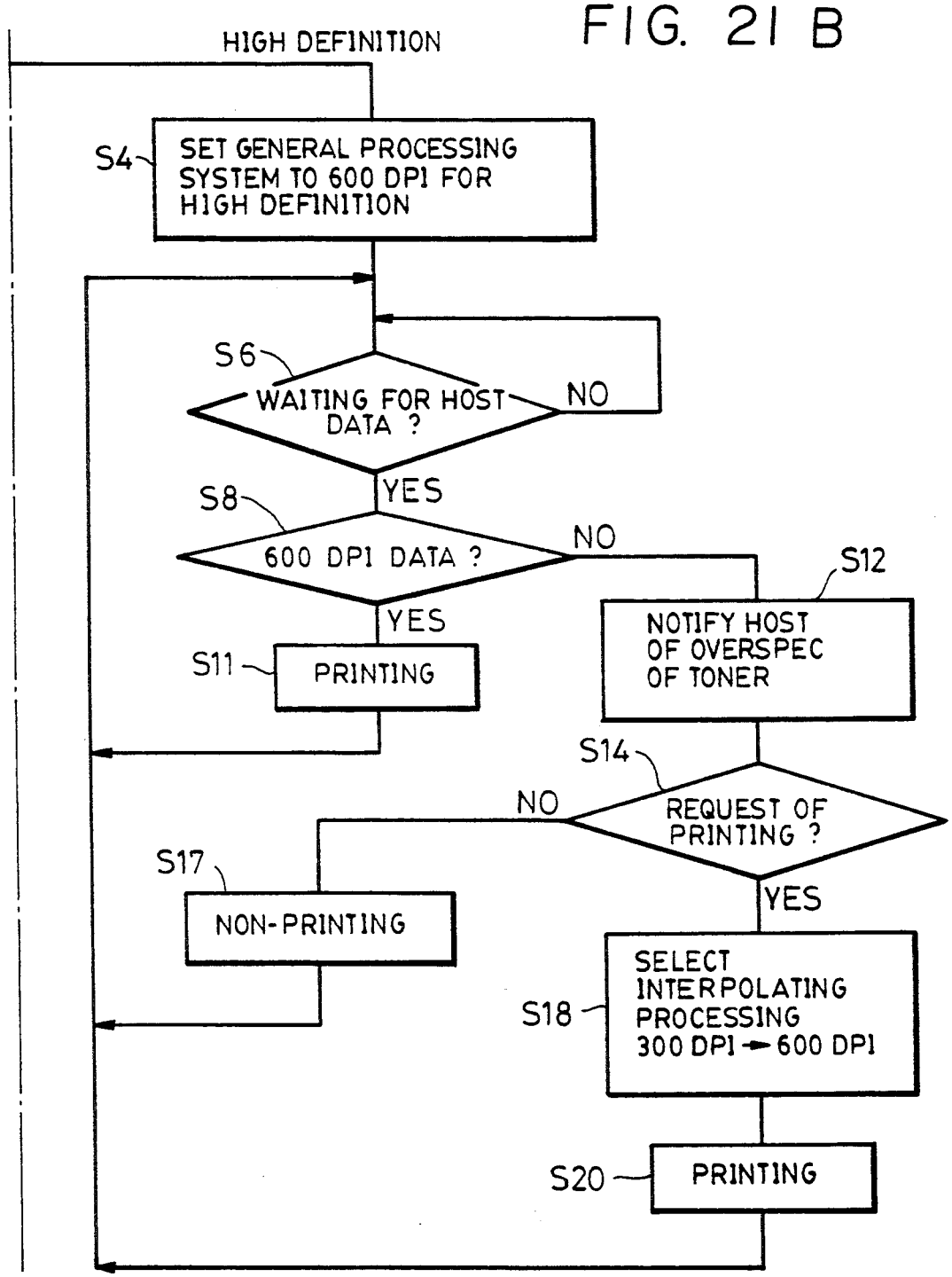

As an example in which an image signal processing system is changed according to information on toner's particle size from the light interrupting sensor 452, an algorithm in which the picture-element density is switched between 300 dpi and 600 dpi is shown in FIG. 21, wherein printing is performed with 300 dpi when normal toner is used, and printing with 600 dpi is also possible when high-definition toner is used.

Figure 15:
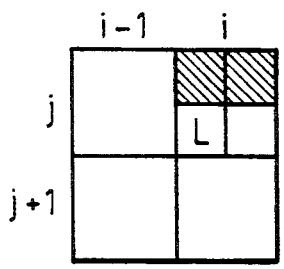
FIGS. 15 and 16, each composed of FIGS. 15(A) and 15(B), and FIGS. 16(A) and 16(B), respectively, are diagrams for explaining interpolation.
Figure 16:
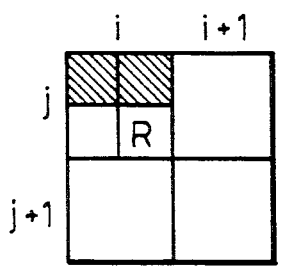

According to information from the sensor 452 or the like (S2), the printing apparatus (S1) mounting the toner cartridge sets the rotation speed of the mirror, rotation of the drum, the laser light and the like to respective predetermined values (S3 and S4). The apparatus then receives data from the host computer (S5 and S6), and performs printing without modification if the data indicate the picture-element density coinciding with the set values (S7, S10, S8 and S11). In a state in which various set values in the printing apparatus are for the 600-dpi mode (FIG. 21B), if the pictire-element density in the input data is 300 dpi, the host computer is notified that the toner is high printing density toner (S12). The apparatus determines if there is a request for printing from the host computer (S14). If there is no request for printing, printing is not performed (S17), and the process returns to S6. If there is a request for printing, various set values in the circuitry shown in FIG. 12 may be partially corrected for 300-dpi use, and printing can proceed. Alternatively, and as shown in FIG. 21, interpolating processing is performed from 300-dpi data in the 600-dpi mode (S18), and printing is then performed (S20). That is, since the 300-dpi data are only ¼ of the 600-dpi data, it is necessary to complement the data through interpolating processing. Four picture elements of 600 dpi correspond to one picture element of 300 dpi. However, if the 600-dpi picture elements are simply made to correspond with the 300-dpi element, coarseness in 300-dpi printing is maintained as it is, and no merit in 600-dpi printing appears. Hence, various conversion methods exist. FIGS. 15 and 16 show examples of such conversion methods and illustrate the process of filling in the four picture elements at 600 dpi that correspond to the single picture element (i, j) at 300 dpi. In FIGS. 15 and 16, in the four picture elements at 600 dpi that correspond to one picture element of 300 dpi, the upper two picture elements (hatched portions in FIGS. 15(A) and 16(A)) are filled in based simply on the presence or absence of a picture element of 300 dpi at the corresponding position. As shown in FIGS. 15(A) and 16(A), the lower two picture elements L and R are determined by the corresponding picture element at coordinate (i, j) of 300 dpi and the three adjacent picture elements, that is, referring to L, by four picture elements in total including three picture elements at coordinates (i−1, j), (i−1, j+1) and (i, j+1). In the present embodiment, correspondence shown in Table 1 in FIG. 15(B) is used. Similarly, as for R, correspondence shown in Table 2 in FIG. 16(B) is used.

Figure 17:
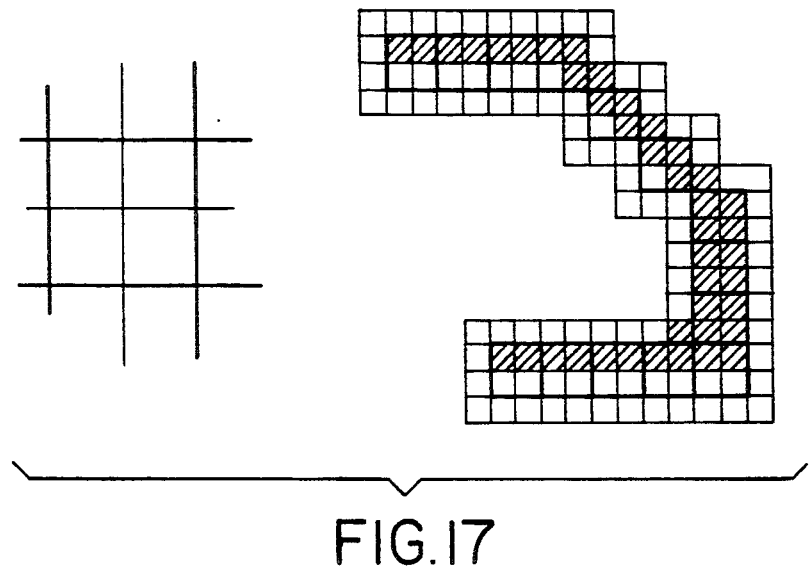
FIG. 17 shows an example of printing as a result of interpolation.

The result obtained from the above-described correspondence is shown in FIG. 17. In the present example, although an oblique line is smoothly converted, lateral lines become thin.

FIG. 14 illustrates a circuit for realizing such processing.

In order to perform 600-dpi printing while maintaining paper-feed speed of the printing apparatus constant, the scanner motor must rotate at a double speed, and so the speed to send data is doubled. Furthermore, the width of a picture element is halved. As a result, the clock frequency for the picture element at 600-dpi printing becomes four times that at 300 dpi printing. Since the number of scanning lines is doubled, data transmitted from the external apparatus cannot be synchronized with the printing speed. Accordingly, a dual-port memory 706 is inserted as a buffer so that writing (710) and reading operations of image data can be independently performed. There are also shown an image clock signal 711 of 300 dpi, and a horizontal synchronizing signal 712 of 300 dpi. A write address counter 701 is reset for every scanning line. A flip-flop 702 switches between two-series line memories for every scanning line. Since an output from the flip-flop 702 is input to address terminal $A_0$ of the dual-port memory 706, even-numbered addresses alternate with odd-numbered addresses in the memory 706 and become line memories of different series. Data written in the line memory 706 are read from dual-port serial output with a clock signal 714 having a frequency four times that of the clock signal 711. At this time, an odd-numbered address and an even-numbered address are alternately read. That is, two line data are alternately read. The data read from the serial output are input to a 4-bit shift register 707, specific addresses in a table memory 708 are referred to by respective 2-bit data on two lines, and output data 716 are output. The patterns shown in Table 1 in FIGS. 15(B) and Table 2 in FIG. 16(B) are recorded in the table memory 708. A flip-flop 704 switches between the patterns shown in Tables 1 and 2, which correspond to data for L and data for R, respectively. A flip-flop 705, which generates an internal horizontal synchronizing signal, switches between a simple output and an interpolating output for each scanning line. That is, it switches processing for the upper two picture elements and lower two picture elements shown in FIGS. 15 and 16.

Referring again to FIG. 21, if the picture-element density of received image data is finer than the set value (S7), high-quality printing cannot be performed. Hence, the host computer is notified of this fact or the like (S9), and an instruction is waited for (S15). If there is no request for printing, printing is not performed (S16), and the process returns to S5. If there is a request for printing, a printing mode of 300 dpi is forcibly provided at step S15, for example by processes such as reducing the number of data, obtaining an average value of data, and the like, and forced printing is performed at S19.

Fifth Embodiment

Figure 22:
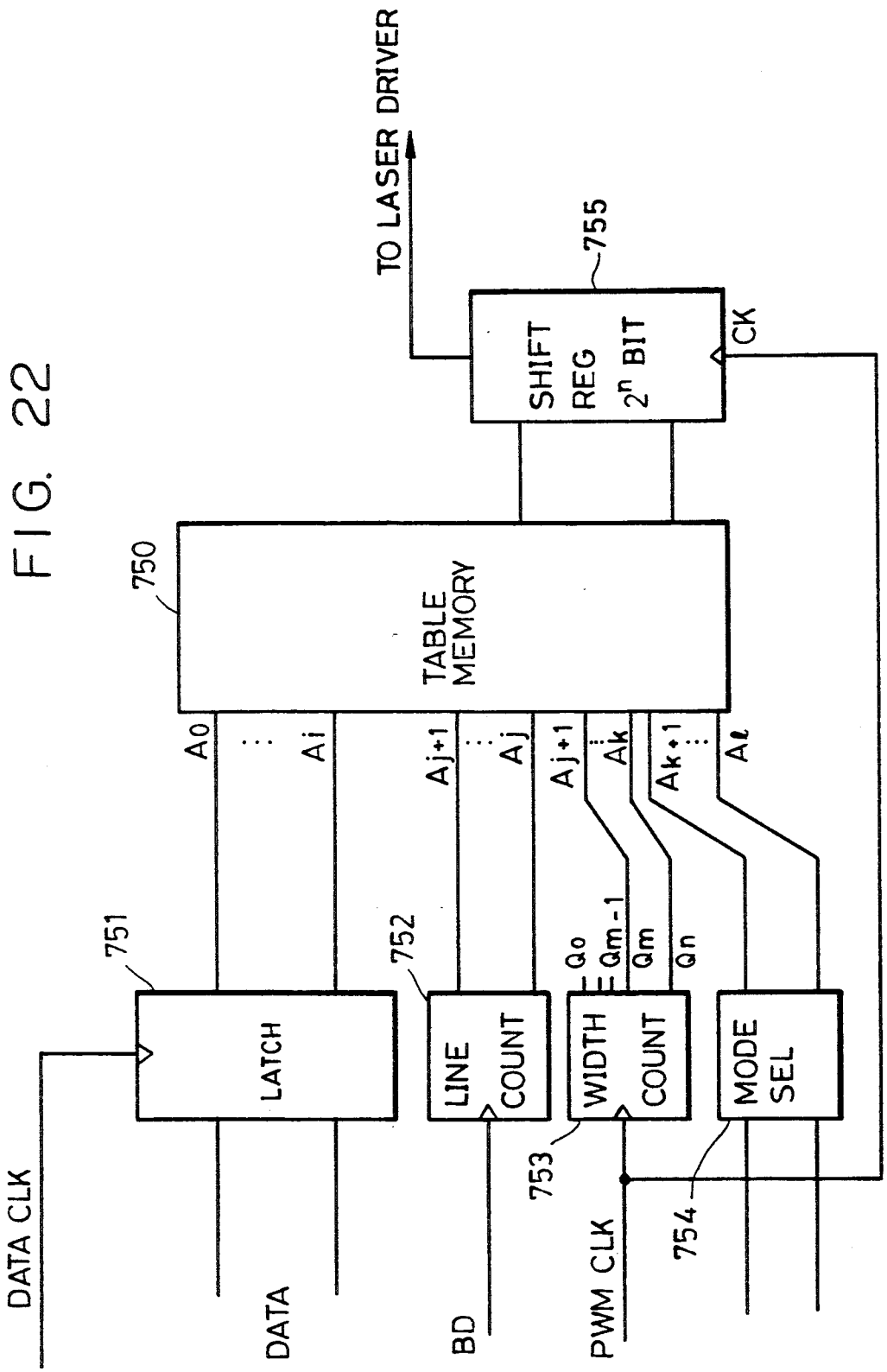
FIG. 22 is a circuit diagram for representing gradation by a plurality of picture elements and PWM (pulse-width modulation)

FIGS. 22-24 show a fifth embodiment of the present invention. The fifth embodiment illustrates a processing system corresponding to multivalue gradation representation. As methods for multivalue representation in a laser-beam printer or the like, there are intensity modulation in which light intensity for one picture element is changed to adjust the amount of toner, PWM (pulse-width modulation) in which an exposed area within a picture element is changed as shown in FIGS. 24A-F a dither method using a plurality of picture elements are used in which light and shade in an image are represented by changing the number of picture elements within an area also as shown in FIGS. 24A-F and the like.

Modulation in light intensity makes it difficult to maintain linearity. Representation by a plurality of picture elements causes a decrease in resolution. On the other hand, since the particle size of toner is about 10 μm, further increases in definition cannot be expected even if the width of an exposed area is made narrower than the particle size of the toner. Each graduation step corresponds to about 3-4 particles of toner in the case of 300 dpi, and about 4-5 particles when high-definition toner is used. Accordingly, in order to obtain gradation steps of about 8 bits, it is necessary to use also a method for representing halftone using a plurality of picture elements, such as a dither method or the like, in addition to PWM. In this case, the decrease in resolution is greatly suppressed because the number of bits in representing gradation using a plurality of picture elements is smaller.

In the fifth embodiment, according to information on the particle size of the toner, the image processing circuit within the printing apparatus is switched to change to PWM for representing gradation. Also, the image processing circuit is switched to change the distribution ratio between representation by a plurality of picture elements, and the minimum pulse width in PWM to a predetermined value corresponding to the particle size of the toner. Since the minimum pulse width can be set to a small value when the particle size of the toner is small, finer representations of gradation becomes possible by PWM. Accordingly, the distribution of representation of gradation by PWM is increased, and distribution of representation of gradation by a plurality of picture elements is reduced. That is, the number of necessary picture elements is reduced by the amount of more pulses can be included within one picture element, and so an area necessary for representation of gradation is reduced.

As shown in FIGS. 23A and B, representation is switched according to the particle size of toner. In FIG. 23A, 65-step representation is adopted. In the upper drawing, $2^2$ pulses are used for one picture element, and $2^4$ picture elements are used. FIG. 23B shows a case in which one picture element can be divided into up to $2^4$ pulses, and only $2^2$ picture elements are needed.

FIG. 22 illustrates a circuit configuration for realizing the representation shown in FIG. 23.

In FIG. 22, a memory 750 performs pattern conversion as shown in FIGS. 23A and B. A latch 751 stores multivalue data. A counter 752 counts picture elements in the vertical direction in representation by a plurality of picture elements. Lower order bits output from the counter 752 are neglected as the width of representation by a plurality of picture elements becomes narrower (the same pattern is written in the memory 750). A counter 743 reads patterns of representation by a plurality of picture elements and representation by PWM in the horizontal direction. A plurality of data in the memory 750 are simultaneously read, are subjected to parallel-to-serial conversion by a shift register 755, and are output to a laser driving circuit. Lower outputs from the counter 753 are vacant by the amount simultaneously written in the shift register 755. A PWM CLK (clock) signal having the minimum pulse width representable in the system is input, and representation by a width pulse is performed by continuation of identical values.

A register 754 sets a mode. The above-described switching of the PWM's pulse width, the number of picture elements in the horizontal and vertical directions, and the like is controlled by patterns in the memory 750, and is determined by the register 754.

The external apparatus, such as the computer or the like, can minimize the amount of data transfer by obtaining distribution ratios between representation of gradation by a plurality of picture elements and that by PWM from the printing apparatus. A dither method, serving as another method, can be realized as a part of mode setting in the same hardware. In this case, the amount of data transfer is invariable.

As explained above, in the fourth embodiment, disagreement between print representation capability of toner particles and the data format can be prevented. In the fifth embodiment, an optimum halftone representation can be provided in accordance with representation capability of toner particles. Thus, it is possible to record an image having an optimum quality in accordance with toner's particle size. Although, in the above-described embodiments, toner's particle size is detected from the toner cartridge, toner may be formed on the photosensitive member and the particle size of the toner may be directly detected from reflected light by a reading means.

Furthermore, it is of course possible to combine the first through third embodiments shown in FIGS. 1 through 8, with the fourth and fifth embodiments shown in FIGS. 11 through 24. That is, by setting the minimum pulse-control width shown in FIGS. 23A and B to 0.7-4 times, and more preferably 2-3 times an average particle size of toner, an optimum halftone representation becomes possible.

In other words, by having a configuration so that a processing circuit having the maximum pulse-control width corresponding to 0.7-4 times toner's average particle size is selected in accordance with a change in toner's particle size due to exchange of the toner cartridge, an optimum halftone representation in accordance with each cartridge or each toner becomes possible.

As explained above, according to the present invention, it becomes possible to provide an image forming apparatus capable of recording a high-quality image. The present invention is not limited to the above-described embodiments, but various uses and modifications may be made within the scope of the following claims.

What is claimed is:

1. An image forming apparatus comprising:
   area modulation means for forming a halftone image signal by area modulation according to input image data; and a recording unit for performing recording using a particle-type recording material according to said halftone image signal;

wherein a length of a short side of a minimum modulation area of said area modulation means formed by said recording unit is set to 0.7-4 times an average particle size of the particle-type recording material wherein said area modulation means performs pulse-width modulation of the input image data.

2. An image forming apparatus according to claim 1, wherein said area modulation means performs area modulation of the input image data by a dither method.

3. An image forming apparatus according to claim 1, wherein the length of the short side is set to 2-3 times the average particle size.

4. An image forming apparatus according to claim 1, wherein said recording unit comprises a latent-image forming unit for forming an electrostatic latent image on a recording member, and a developing unit for developing the latent image with the particle-type recording material.

5. An image forming apparatus according to claim 1, wherein the input image data are multivalue image data having at least three values for one picture element.

6. An image forming apparatus comprising:
a recorder for performing recording on a recording member using a particle-type recording material;
a detector for detecting a particle size of said particle-type recording material;
a record controller for operating said recorder in a plurality of recording modes; and
a selector for selecting one of the recording modes of said record controller according to the particle size detected by said detector.

7. An image forming apparatus according to claim 6, further comprising an image processor for processing input image data in a plurality of processing modes, and wherein said selector selects one of the processing modes of said image processor according to the particle size detected by said detector.

8. An image forming apparatus according to claim 6, wherein said detector detects a particle size of the particle-type recording material by an indicator indicating the particle size provided at a receptacle for receiving said particle-type recording material.

9. An image forming apparatus according to claim 6, wherein the particle size corresponds to resolution of input image data, and wherein said recorder does not perform recording of the input image data when the particle size detected by the detector does not correspond to a resolution of said input image data.

10. An image forming apparatus according to claim 6, wherein the particle size corresponds to a resolution of input image data, and wherein said apparatus further comprises a converter for converting the resolution of said input image data when the particle size detected by the detector does not correspond to the resolution of the input image data.

11. An image forming apparatus according to claim 7, wherein at least one of the plurality of processing modes forms a halftone image signal by area modulation, and wherein said selector selects a processing mode for setting the length of a short side of a minimum modulation area formed on the recording member by area modulation to 0.7-4 times the particle size detected by said detector.

12. An image forming method comprising steps of:
inputting an image signal;
pulse-width modulating the image signal based on the input image signal to obtain a recording signal for laser beam printing; and
defining a time duration of a minimum pulse-width of the pulse-width modulation such that a length of a short side of a minimum modulation area of said pulse-width modulation step for laser beam printing is set to 0.7-4 times an average particle size of a particle-type recording material.

13. An image forming method according to claim 12, wherein said pulse-width modulating step comprises a dither method.

14. An image forming method according to claim 12, wherein the minimum pulse width is defined such that the length of the short side is set to 2-3 times the average particle size.

15. A controller for laser beam printing comprising:
input means for inputting an image data;
detecting means for detecting a particle size of a particle-type recording material used for the laser beam printing;
controlling means for operating the laser beam printing having a plurality of recording modes; and
selecting means for selecting one of the recording modes of said controlling means according to the particle size detected by said detecting means.

16. A controller for laser beam printing according to claim 15, further comprising an image processor for processing input image signal in a plurality of processing modes, and wherein said selecting means select one of the processing modes of said image processor according to the particle size detected by said detecting means.

17. A controller according to claim 16, wherein at least one of the plurality of processing modes forms a halftone image signal by pulse-width modulation, and wherein said selecting means selects a processing mode for setting a minimum pulse width of a recording signal obtained by a process such that a length of a short side of a minimum modulation area formed on a recording member by pulse-width modulation is set to 0.7-4.0 times the particle size detected by said detecting means.

18. A controller for laser beam printing according to claim 15 wherein said detecting means detect a particle size of the particle-type recording material by an indicator indicating the particle size proved at a receptacle for receiving the particle-type recording material.

19. A controller according to claim 15, wherein said particle size corresponds to a resolution of the input image data, and wherein said controlling means inhibits recording of said input image data when the particle size detected by the detecting means does not correspond to the resolution of the input image signal.

20. A controller according to claim 15, wherein said particle size corresponds to a resolution of the input image data, and wherein said controller further comprises a converter for converting the resolution of the input image data when the particle size detected by the detecting means does not corresponds to the resolution of the input image data.

* * * * *

UNITED STATES PATENT AND TRADEMARK OFFICE
CERTIFICATE OF CORRECTION

PATENT NO. : 5,124,802

DATED : June 23, 1992

INVENTOR(S) : Itoh, et al.

It is certified that error appears in the above-identified patent and that said Letters Patent is hereby corrected as shown below:

On the Title Page and Col. 1, line 1

>  Under [54], the first line of the title, "LASAR" should read --LASER--;

On the Title Page, item

>  [75], Inventors, "Kaoru Seto, Yokohama" should read --Kaoru Seto, Chigasaki--.

COLUMN 3

>  Line 15, "particle" should read --particle size of a particle-type ink material--.

COLUMN 4

>  Line 16, "FIG. 23A" should read --FIGS. 23A--;
>  Line 18, "ment/PWM" should read --ments/PWM--; and
>  Line 62, "f-O" should read --f$\theta$--.

COLUMN 5

>  Line 9, "Tone" should read --toner--.

COLUMN 6

>  Line 43, "400 psi" should read --400 dpi--.

UNITED STATES PATENT AND TRADEMARK OFFICE
CERTIFICATE OF CORRECTION

PATENT NO. : 5,124,802
DATED : June 23, 1992
INVENTOR(S) : Itoh, et al.

It is certified that error appears in the above-identified patent and that said Letters Patent is hereby corrected as shown below:

COLUMN 8

Line 64, "FIG. 13B, an" should read --FIG. 13B, on an--.

COLUMN 9

Line 7, "discrimation" should read --discrimination--.

COLUMN 10

Line 47, "FIGS." should read --FIG.--.

COLUMN 11

Line 23, "graduation" should read --gradation--;
Line 44, "becomes" should read --become--;
Line 49, "of" should read --that--; and
Line 61, "FIG. 23" should read --FIGS. 23A and B--.

COLUMN 13

Line 64, "the" should read --a--.

UNITED STATES PATENT AND TRADEMARK OFFICE
CERTIFICATE OF CORRECTION

PATENT NO. : 5,124,802          Page 3 of 3
DATED      : June 23, 1992
INVENTOR(S): Itoh, et al.

It is certified that error appears in the above-identified patent and that said Letters Patent is hereby corrected as shown below:

COLUMN 14

Line 3, "steps" should read --the steps--;
       Line 22, "an" should be deleted;
       Line 34, "select" should read --selects--;
       Line 48, "claim 15" should read --claim 15,-- and "detect" should read --detects--;
       Line 50, "proved" should read --detects--;
       Line 57, "signal" should read --data--; and
       Line 63, "corresponds" should read --correspond--.

Signed and Sealed this

Twenty-second Day of December, 1992

Attest:

DOUGLAS B. COMER

*Attesting Officer*         Acting Commissioner of Patents and Trademarks

UNITED STATES PATENT AND TRADEMARK OFFICE
CERTIFICATE OF CORRECTION

PATENT NO.   :   5,124,802
DATED        :   June 23, 1992
INVENTOR(S)  :   Michio Ito, et al.

It is certified that error appears in the above-identified patent and that said Letters Patent is hereby corrected as shown below:

Column 1, line 2, change "LASAR" to --LASER--.

Signed and Sealed this

Nineteenth Day of January, 1993

Attest:

DOUGLAS B. COMER

Attesting Officer   Acting Commissioner of Patents and Trademarks